(12) United States Patent
Bodoc et al.

(10) Patent No.: US 11,912,797 B2
(45) Date of Patent: Feb. 27, 2024

(54) SELF-INVERTIBLE INVERSE LATEX COMPRISING, AS AN INVERTING AGENT, SURFACTANT SPECIES OF THE POLYGLYCEROL ESTER FAMILY, USE THEREOF AS A THICKENING AGENT, AND AQUEOUS LIQUID DETERGENT COMPOSITIONS COMPRISING SAME FOR HOUSEHOLD OR INDUSTRIAL USE

(71) Applicant: SOCIETE D'EXPLOITATION DE PRODUITS POUR LES INDUSTRIES CHIMIQUES SEPPIC, Paris (FR)

(72) Inventors: Miruna Bodoc, Lavaur (FR); Jérôme Guilbot, Castres (FR); Georges Da Costa, Saix (FR); Aurélie Colas, Marly le Roi (FR)

(73) Assignee: SOCIETE D'EXPLOITATION DE PRODUITS POUR LES INDUSTRIES CHIMIQUES SEPPIC, Paris (FR)

( * ) Notice: Subject to any disclaimer, the term of this patent is extended or adjusted under 35 U.S.C. 154(b) by 723 days.

(21) Appl. No.: 16/978,430

(22) PCT Filed: Feb. 27, 2019

(86) PCT No.: PCT/FR2019/050444
§ 371 (c)(1),
(2) Date: Sep. 4, 2020

(87) PCT Pub. No.: WO2019/170980
PCT Pub. Date: Sep. 12, 2019

(65) Prior Publication Data
US 2021/0054310 A1  Feb. 25, 2021

(30) Foreign Application Priority Data

Mar. 6, 2018 (FR) ...................................... 1851932

(51) Int. Cl.
| | | |
|---|---|---|
| *C11D 3/37* | (2006.01) |
| *B01J 41/14* | (2006.01) |
| *C08F 2/32* | (2006.01) |
| *C08F 220/58* | (2006.01) |
| *C11D 3/00* | (2006.01) |
| *C11D 3/20* | (2006.01) |
| *C11D 3/22* | (2006.01) |
| *C11D 3/43* | (2006.01) |
| *C11D 11/00* | (2006.01) |
| *C11D 17/00* | (2006.01) |

(52) U.S. Cl.
CPC ................. *C08F 2/32* (2013.01); *B01J 41/14* (2013.01); *C08F 220/585* (2020.02); *C11D 3/0005* (2013.01); *C11D 3/2065* (2013.01); *C11D 3/2093* (2013.01); *C11D 3/226* (2013.01); *C11D 3/3707* (2013.01); *C11D 3/378* (2013.01); *C11D 3/43* (2013.01); *C11D 11/0029* (2013.01); *C11D 17/0017* (2013.01)

(58) Field of Classification Search
CPC ... C11D 3/37; C11D 11/0023; C11D 17/0021; C11D 3/43; C11D 17/0017
See application file for complete search history.

(56) References Cited

U.S. PATENT DOCUMENTS

| | | | |
|---|---|---|---|
| 6,375,959 B1 | 4/2002 | Mallo et al. | |
| 2002/0146375 A1* | 10/2002 | Schreiber | C09K 23/14 424/59 |
| 2006/0269490 A1* | 11/2006 | Braun | A61P 17/00 424/59 |
| 2010/0202984 A1* | 8/2010 | Langhals | C07D 471/04 424/59 |
| 2011/0076245 A1* | 3/2011 | Braun | A61K 8/33 424/59 |
| 2011/0098364 A1* | 4/2011 | Braun | A61K 8/8158 514/772.1 |
| 2013/0022560 A1* | 1/2013 | Schlifkeposchalko | C07C 59/90 424/59 |
| 2013/0025496 A1* | 1/2013 | Ezaki | C09D 11/023 106/31.26 |
| 2013/0195779 A1* | 8/2013 | Norman | A61K 8/8152 424/59 |
| 2015/0050316 A1* | 2/2015 | Stangl | A61K 9/10 424/195.17 |
| 2016/0167040 A1* | 6/2016 | Braun | A61K 8/8158 521/38 |
| 2020/0354655 A1* | 11/2020 | Bodoc | C11D 3/2065 |

FOREIGN PATENT DOCUMENTS

| | | |
|---|---|---|
| EP | 1 055 451 | 11/2000 |
| FR | 2 794 034 | 12/2000 |

(Continued)

OTHER PUBLICATIONS

International Search Report for PCT/FR2019/050444 dated May 17, 2019, 6 pages, with English Translation.

(Continued)

*Primary Examiner* — Charles I Boyer
(74) *Attorney, Agent, or Firm* — NIXON & VANDERHYE

(57) ABSTRACT

Disclosed is a self-invertible inverse latex including, as an inverting agent, surfactant species of the polyglycerol ester family, the use thereof as a thickening and/or emulsifying and/or stabilising agent for a detergent or cleaning formulation for industrial or household use, and aqueous liquid detergent compositions including same, for household or industrial use.

19 Claims, No Drawings

(56) References Cited

FOREIGN PATENT DOCUMENTS

| FR | 2 794 124 | 12/2000 |
| FR | 2 808 446 | 11/2001 |
| FR | 2 808 447 | 11/2001 |
| FR | 2 810 883 | 1/2002 |
| WO | 2009/156691 | 12/2009 |
| WO | 2016/020622 | 2/2016 |

OTHER PUBLICATIONS

Written Opinion of the ISA for PCT/FR2019/050444 dated May 17, 2019, 8 pages.
French Search Report for French Application No. 1851932 dated Nov. 12, 2018.
Donald Voet and Judith G. Voet, "Biochemistry," John Wiley & Sons, 1990, p. 250.

* cited by examiner

SELF-INVERTIBLE INVERSE LATEX COMPRISING, AS AN INVERTING AGENT, SURFACTANT SPECIES OF THE POLYGLYCEROL ESTER FAMILY, USE THEREOF AS A THICKENING AGENT, AND AQUEOUS LIQUID DETERGENT COMPOSITIONS COMPRISING SAME FOR HOUSEHOLD OR INDUSTRIAL USE

BACKGROUND OF THE INVENTION

Field of the Invention

The invention relates to self-invertible inverse latices comprising, as inverting agent, a surfactant composition comprising polyglycerol esters and glycerol and/or glycerol oligomers, to the use of said self-invertible inverse latices as thickeners used for preparing detergent or cleaning formulations for industrial or household use, and also to these formulations.

Description of the Related Art

These detergent or cleaning formulations for industrial or household use are either alkaline or acidic. The alkaline formulations are generally used for removing greasy soiling from hard surfaces, whereas the acidic formulations are used not only for removing soiling, but also for descaling said surfaces. They are particularly suitable for cleaning and descaling agrifood industrial facilities, or for descaling household electrical appliances, such as dishwashers and coffee machines. They are also used for removing concrete or cement residues, and for the cleaning of concrete surfaces that are ingrained with grease, before any painting of said concrete surfaces. Acidic detergent formulations should not cause substantial formation of foam during the cleaning operation in the presence of the soiling to be treated, they must have good foaming and detergent properties. Detergent or cleaning formulations for industrial or household use are in the form of powders, concentrates, liquids such as emulsions, and, depending on the case, are used directly or after dilution in a suitable solvent. In liquid form, such as emulsions, they include rheology modifiers during their manufacture.

These rheology modifiers are preferably thickeners and/or gelling agents, the purpose of which is to thicken the aqueous phase or the emulsion comprising the detergent surfactants, so as to enable the user to control the flow thereof, for example by means of a circulation pump, and also to be able to suspend and/or stabilize solid particles. Among the rheology modifiers that may be used for the preparation of detergent or cleaning formulations for industrial or household use, mention may be made of synthetic polymers, for instance linear or branched, crosslinked or noncrosslinked anionic, or cationic, or ampholytic polyelectrolytes, which are in two physical forms, powder form and liquid form.

The international patent application published under the number WO 2016/020622 A1 describes the use, for manufacturing a detergent liquid aqueous composition for household or industrial use, of a branched or crosslinked polymer obtained by polymerization of an aqueous solution of one or more monomers in inverse emulsion of water-in-oil type, with at least one of the monomers used being an acrylic monomer and one or more of the monomers used being a monomer bearing at least one weak acid function, the molar percentage of monomers bearing at least one weak acid function relative to the total amount of monomers used being at least 30%.

In processes for preparing self-invertible inverse latices via the use of inverse emulsion radical polymerization, the surfactants of oil-in-water type are added on conclusion of the polymerization step. The purpose of their addition is to modify and adjust the hydrophilic-lipophilic balance of the water-in-oil emulsion comprising the polymer (also known as an "inverse latex") so as to obtain a mixture which, once added to a polar phase, for instance water, will change emulsion direction to pass from the water-in-oil form to the oil-in-water form, then making it possible to place the polymer prepared previously in contact with the polar phase to be thickened. During such a physical phenomenon, the polymer of crosslinked and/or branched polyelectrolyte type is deployed in said polar phase and forms a three-dimensional network allowing the polar phase to swell, which is manifested by an increase in the viscosity of this polar phase.

The mixture comprising the "inverse latex" and the surfactant of oil-in-water type is known as a self-invertible inverse latex and said surfactant of oil-in-water type is known as an "inverter" or "inverting agent".

The inverting agents commonly used for the preparation of self-invertible inverse latices are surfactants of oil-in-water type which have an HLB (hydrophilic-lipophilic balance) value that is high enough to make it possible to prepare stable emulsions of oil-in-water type, generally greater than 9 and less than 16. They generally comprise a hydrophilic part consisting of a sequence of ethylene oxide units and a part consisting of a hydrocarbon-based aliphatic chain of hydrophobic nature. Among these inverting agents are:

ethoxylated fatty alcohols, the hydrocarbon-based aliphatic chain of which includes from 8 to 14 carbon atoms and the number of ethylene oxide units of which is between 5 and 40, for example lauryl alcohol ethoxylated with 7 mol of ethylene oxide (INCI name: Laureth-7) or tridecyl alcohol with 6 mol of ethylene oxide (INCI name: Trideceth-6);

ethoxylated sorbitan esters, the hydrocarbon-based aliphatic chain of which includes from 12 to 22 carbon atoms and the number of ethylene oxide units of which is between 5 and 40, for example sorbitan oleate ethoxylated with 20 mol of ethylene oxide, sold under the trade name Montanox™80, or sorbitan laurate ethoxylated with 20 mol of ethylene oxide, sold under the trade name Montanox™20;

ethoxylated alkylphenols, for example ethoxylated nonylphenols and ethoxylated octylphenols; or ethoxylated castor oils, for example castor oil ethoxylated with 40 mol of ethylene oxide, sold under the brand name Simulsol™ OL 50.

Changes in consumer demands and in the regulatory provisions have led cosmetic composition formulators to reduce the proportion of ingredients including ethylene oxide units in their formulations. There is thus a need to prepare self-invertible inverse latices which are free of ethoxylated surfactants as inverting agents.

The French patent applications published under the numbers 2 794 034, 2 794 124, 2 808 447, 2 808 446 and 2 810 883 describe the use of alkylpolyglycosides, the hydrocarbon-based alkyl chain of which includes from 1 to 30 carbon atoms, as inverting agents for preparing self-invertible inverse latices, for instance mixtures of alkylpolyglucosides whose hydrocarbon-based alkyl chains are decyl, dodecyl and tetradecyl chains, for instance the mixture sold under the brand name Simulsol™ SL 10, dodecyl, tetradecyl and hexadecyl chains, for instance the mixture sold under the brand name Simulsol™ SL 26, octyl and decyl chains, for instance the mixture sold under the brand name Simulsol™ SL 8, or the undecylenyl chain, for instance the mixture sold under the brand name Simulsol™ SL 11 W.

However, the implementation of such compounds for preparing self-invertible inverse latices must be performed at a temperature above their melting point, i.e. generally at a temperature above 70° C., which poses problems of increase of the viscosity of the inverse latex and entails a certain amount of destabilization of said self-invertible inverse latex prepared. In certain cases it is performed by prediluting said alkylpolyglycosides in water to have a liquid form that is manipulable at room temperature. This occasionally has the consequence of reducing the rate of inversion of said self-invertible inverse latices in the polar phases to be thickened, and thus of reducing the productivity of processes for preparing cosmetic formulations comprising such thickeners.

The international patent application published under the number WO 2009/156691 discloses the use of polyglycerol esters as inverting agents for preparing self-invertible inverse latices, for example decaglycerol esters such as decaglyceryl monolaurate, decaglyceryl oleate, decaglyceryl monocaprylate or decaglyceryl monomyristate. However, their use leads to self-invertible inverse latices for which the rate of inversion in the polar phases to be thickened is too slow and even decreases when the self-invertible inverse latex is stored after its preparation for more than one month of preparation.

SUMMARY OF THE INVENTION

The inventors have thus sought to develop a novel inverting surfactant system of oil-in-water type, which is compatible with the environmental standards in force, being notably free of alkylene oxide units, which make it possible to prepare self-invertible inverse latices:
which can be readily usable and notably which can be pumped at 25° C., which have a viscosity of less than or equal to 8000 mPa·s, preferably less than or equal to 5000 mPa·s, this viscosity being measured at 25° C. using a Brookfield RVT viscometer and a No. 3 spindle at a speed of 20 revolutions/minute,
which have a smooth appearance, and are free of grains or lumps, and
which have good inversion properties in polar phases, that is to say inducing a fast and reliable rate of inversion.

According to a first aspect, one subject of the invention is thus a self-invertible inverse latex of a crosslinked anionic polyelectrolyte (P) comprising, per 100 mol %:
($a_1$)—a proportion of greater than or equal to 30 mol % and less than or equal to 100 mol %, of monomer units derived from 2-methyl-2-[(1-oxo-2-propenyl)amino]-1-propanesulfonic acid in free acid or partially or totally salified form;
($a_2$)—optionally a proportion of greater than 0 mol % and less than or equal to 70%, of monomer units derived from at least one monomer chosen from the elements of the group consisting of acrylic acid, methacrylic acid, 2-carboxyethylacrylic acid, itaconic acid, maleic acid, 3-methyl-3-[(1-oxo-2-propenyl)amino]butanoic acid, the carboxylic function of said monomers being in free acid, partially or totally salified form, and/or from the elements of the group consisting of (2-hydroxyethyl) acrylate, (2,3-dihydroxypropyl) acrylate, (2-hydroxyethyl) methacrylate, (2,3-dihydroxypropyl) methacrylate or vinylpyrrolidone;
($a_3$)—a proportion of greater than 0 mol % and less than or equal to 1 mol % of monomer units derived from at least one diethylenic or polyethylenic crosslinking monomer (AR);
the sum of said molar proportions of monomer units according to $a_1$), $a_2$) and $a_3$) being equal to 100 mol %;
said self-invertible inverse latex being an emulsion of water-in-oil type (E) comprising, per 100% of its mass:
a)—from 10% by mass to 90% by mass of said crosslinked anionic polyelectrolyte (P);
b)—from 5% by mass to 50% by mass of a fatty phase consisting of at least one oil (H);
c)—from 1% by mass to 50% by mass of water;
d)—from 0.5% by mass to 10% by mass of an emulsifying system of water-in-oil type ($S_1$); and
e)—from 2% by mass to 10% by mass of an emulsifying system of oil-in-water type ($S_2$);
the sum of the mass proportions of compounds according to a), b), c), d) and e) being equal to 100% by mass;
said self-invertible inverse latex being characterized in that said emulsifying system of oil-in-water type (S2) comprises, per 100% of its mass:
f)—a proportion of greater than or equal to 50% by mass and less than or equal to 100% of a composition (Ce) comprising, per 100% of its mass:
$e_1$)—from 10% by mass to 60% by mass, more particularly from 15% by mass to 60% by mass and most particularly from 15% by mass to 50% by mass of at least one compound of formula (I):

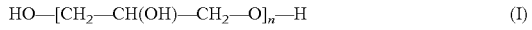
$$HO-[CH_2-CH(OH)-CH_2-O]_n-H \qquad (I)$$

in which n represents an integer greater than or equal to 1 and less than or equal to 15, and
$e_2$)—from 40% by mass to 90% by mass, more particularly from 40% by mass to 85% by mass and most particularly from 50% by mass to 85% by mass of at least one compound of formula (II):

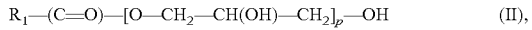
$$R_1-(C=O)-[O-CH_2-CH(OH)-CH_2]_p-OH \qquad (II),$$

in which p, which is different from or identical to n, represents an integer greater than or equal to 1 and less than or equal to 15; and in which the group $R_1-(C=O)-$ represents a saturated or unsaturated, linear or branched aliphatic radical including from 6 to 22 carbon atoms; and optionally
$e_3$)—up to 30% by mass, more particularly from 0% by mass to 25% by mass and most particularly from 0% by mass to 20% by mass of at least one composition ($C_{11}$) represented by formula (III):

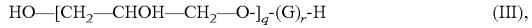
$$HO-[CH_2-CHOH-CH_2-O-]_q-(G)_r-H \qquad (III),$$

in which q, which is different from or identical to n, represents an integer greater than or equal to 1 and less than or equal to 3, G represents a reducing sugar residue and r represents a decimal number greater than or equal to 1.05 and less than or equal to 5.00;
said composition ($C_{11}$) consisting of a mixture of the compounds of formulae ($III_1$), ($III_2$), ($III_3$), ($III_4$) and ($III_5$):

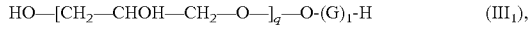
$$HO-[CH_2-CHOH-CH_2-O-]_q-O-(G)_1-H \qquad (III_1),$$

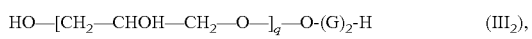
$$HO-[CH_2-CHOH-CH_2-O-]_q-O-(G)_2-H \qquad (III_2),$$

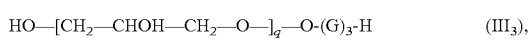
$$HO-[CH_2-CHOH-CH_2-O-]_q-O-(G)_3-H \qquad (III_3),$$

$$\text{HO—[CH}_2\text{—CHOH—CH}_2\text{—O—]}_q\text{—O-(G)}_4\text{-H} \quad (III_4),$$

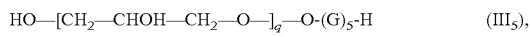

$$\text{HO—[CH}_2\text{—CHOH—CH}_2\text{—O—]}_q\text{—O-(G)}_5\text{-H} \quad (III_5),$$

in molar proportions of said compounds of formulae $(III_1)$, $(III_2)$, $(III_3)$, $(III_4)$ and $(III_5)$ respectively equal to $a_1$, $a_2$, $a_3$, $a_4$ and $a_5$, such that the sum $a_1+a_2+a_3+a_4+a_5$ is equal to 1, and such that the sum $a_1+2a_2+3a_3+4a_4+5a_5$ is equal to r;

the sum of the mass proportions of compounds according to $e_1$), $e_2$) and $e_3$) being equal to 100% by mass.

For the purposes of the present invention, the term "crosslinked anionic polyelectrolyte (P)" denotes, for the polymer (P), a nonlinear polymer which is in the form of a three-dimensional network which is insoluble in water, but swellable in water, then leading to the production of a chemical gel.

For the purposes of the present invention, the term "salified" means that the acid function present in a monomer is in an anionic form associated in salt form with a cation, notably alkali metal salts, such as the sodium or potassium cations, or such as cations of nitrogenous bases such as the ammonium salt, the lysine salt or the monoethanolamine salt $(\text{HOCH}_2\text{—CH}_2\text{—NH}_4^+)$. They are preferably sodium or ammonium salts.

According to a particular aspect of the present invention, said self-invertible inverse latex as defined above comprises from 20% by mass to 90% by mass, and more particularly from 30% by mass to 90% by mass, more particularly from 30% by mass to 80% by mass, and even more particularly from 33% by mass to 80% by mass of said crosslinked anionic polyelectrolyte (P).

According to another particular aspect of the present invention, the molar proportion of monomer units derived from 2-methyl-2-[(1-oxo-2-propenyl)amino]-1-propanesulfonic acid in free acid or partially or totally salified form present in said crosslinked anionic polyelectrolyte (P) is greater than or equal to 32 mol % and less than or equal to 100 mol %, more particularly greater than or equal to 40 mol % and less than or equal to 100 mol %.

According to a more particular aspect of the present invention, the 2-methyl-2-[(1-oxo-2-propenyl)amino]-1-propanesulfonic acid is in the sodium or ammonium salt form.

According to another particular aspect of the present invention, said crosslinked anionic polyelectrolyte (P) is derived from the polymerization, per 100 mol %:

($a_1$)—of a proportion of greater than or equal to 32 mol % and less than 100 mol %, more particularly of greater than or equal to 40 mol % and less than or equal to 100 mol %, of monomer units derived from a monomer bearing a strong acid function, which is partially salified or totally salified, more particularly of a sodium salt or an ammonium salt of 2-methyl-2-[(1-oxo-2-propenyl)amino]-1-propanesulfonic acid; and ($a_2$)—of a proportion of greater than 0 mol % and less than or equal to 68%, more particularly greater than 0 mol % and less than or equal to 60 mol %, of monomer units derived from at least one monomer chosen from the elements of the group consisting of acrylic acid, methacrylic acid, 2-carboxyethylacrylic acid, itaconic acid, maleic acid, 3-methyl-3-[(1-oxo-2-propenyl)amino]butanoic acid, the carboxylic function of said monomers being in acid form, which are partially or totally salified, and/or from the elements of the group consisting of (2-hydroxyethyl) acrylate, (2,3-dihydroxypropyl) acrylate, (2-hydroxyethyl) methacrylate, (2,3-dihydroxypropyl) methacrylate and vinylpyrrolidone; and ($a_3$)—of a proportion of greater than 0 mol % and less than or equal to 1 mol % of monomer units derived from at least one diethylenic or polyethylenic crosslinking monomer (AR); it being understood that the sum of the molar proportions of the monomer units ($a_1$), ($a_2$) and ($a_3$) is equal to 100%.

The term "at least one diethylenic or polyethylenic crosslinking monomer (AR)" notably denotes, in the definition of said crosslinked anionic polyelectrolyte (P), a monomer chosen from methylenebis(acrylamide), ethylene glycol dimethacrylate, diethylene glycol diacrylate, ethylene glycol diacrylate, diallylurea, triallylamine, trimethylolpropane triacrylate or methylenebis(acrylamide) or a mixture of these compounds, diallyloxyacetic acid or a salt thereof, such as sodium diallyloxyacetate, or a mixture of these compounds; and more particularly a monomer chosen from ethylene glycol dimethacrylate, triallylamine, trimethylolpropane triacrylate or methylenebis(acrylamide) or a mixture of these compounds.

According to another particular aspect, said crosslinking monomer (AR) is used in a molar proportion of less than or equal to 0.5%, more particularly less than or equal to 0.25% and most particularly less than or equal to 0.1%; it is more particularly greater than or equal to 0.005 mol %.

According to another particular aspect of the present invention, said crosslinked anionic polyelectrolyte (P) is a homopolymer of 2-methyl-2-[(1-oxo-2-propenyl)amino]-1-propanesulfonic acid partially or totally salified in the sodium salt or ammonium salt form, crosslinked with triallylamine and/or methylenebis(acrylamide); a copolymer of 2-methyl-2-[(1-oxo-2-propenyl)amino]-1-propanesulfonic acid and of acrylic acid which are partially or totally salified in the sodium salt or ammonium salt form, crosslinked with triallylamine and/or methylenebis(acrylamide); a copolymer of 2-methyl-2-[(1-oxo-2-propenyl)amino]-1-propanesulfonic acid (γ) partially or totally salified in the sodium salt form and of acrylic acid (δ) partially or totally salified in the sodium salt form in a mole ratio (γ)/(δ) of greater than or equal to 30/70 and less than or equal to 90/10, crosslinked with triallylamine and/or methylenebis(acrylamide); or a copolymer of 2-methyl-2-[(1-oxo-2-propenyl)amino]-1-propanesulfonic acid (γ) partially or totally salified in the sodium salt form and of acrylic acid (δ) partially or totally salified in the sodium salt form in a mole ratio (γ)/(δ) of greater than or equal to 40/60 and less than or equal to 90/10, crosslinked with triallylamine and/or methylenebis(acrylamide).

The term "oil (O)" notably denotes, in the definition of said self-invertible inverse latex:

linear alkanes including from 11 to 19 carbon atoms;

branched alkanes including from 7 to 40 carbon atoms, such as isododecane, isopentadecane, isohexadecane, isoheptadecane, isooctadecane, isononadecane or isoeicosane, or mixtures of certain thereof such as those mentioned below and identified by their INCI name: $C_{7-8}$ isoparaffin, $C_{8-9}$ isoparaffin, $C_{9-11}$ isoparaffin, $C_{9-12}$ isoparaffin, $C_{9-13}$ isoparaffin, $C_{9-14}$ isoparaffin, $C_{9-16}$ isoparaffin, $C_{10-11}$ isoparaffin, $C_{10-12}$ isoparaffin, $C_{10-13}$ isoparaffin, $C_{11-12}$ isoparaffin, $C_{11-13}$ isoparaffin, $C_{11-14}$ isoparaffin, $C_{12-14}$ isoparaffin, $C_{12-20}$ isoparaffin, $C_{13-14}$ isoparaffin, $C_{13-16}$ isoparaffin;

cycloalkanes optionally substituted with one or more linear or branched alkyl radicals, white mineral oils, such as the products sold under the following names: Marcol™ 52, Marcol™ 82, Drakeol™ 6VR, Eolane™ 130 or Eolane™ 150;

hemisqualane (or 2,6,10-trimethyldodecane; CAS number: 3891-98-3), squalane (or 2,6,10,15,19,23-hexamethyltetracosane), hydrogenated polyisobutene or hydrogenated polydecene;

mixtures of alkanes including from 15 to 19 carbon atoms, said alkanes being linear alkanes, branched alkanes and cycloalkanes, and more particularly the mixture ($M_1$) which comprises, per 100% of its mass, a proportion by mass of branched alkanes of greater than or equal to 90% and less than or equal to 100%; a proportion by mass of linear alkanes of greater than or equal to 0% and less than or equal to 9%, and more particularly less than 5%, and a proportion by mass of cycloalkanes of greater than or equal to 0% and less than or equal to 1%, for example the mixtures sold under the name Emogreen™ L15 or Emogreen™ L19;

the fatty alcohol ethers of formula (IV):

$$Z_1\text{—}O\text{—}Z_2 \quad (IV),$$

in which $Z_1$ and $Z_2$, which may be identical or different, represent a linear or branched alkyl radical including from 5 to 18 carbon atoms, for example dioctyl ether, didecyl ether, didodecyl ether, dodecyl octyl ether, dihexadecyl ether, (1,3-dimethylbutyl) tetradecyl ether, (1,3-dimethylbutyl) hexadecyl ether, bis(1,3-dimethylbutyl) ether or dihexyl ether;

monoesters of fatty acids and of alcohols of formula (V):

$$R'_1\text{—}(C\text{=}O)\text{—}O\text{—}R'_2 \quad (V),$$

in which $R'_1$—(C=O) represents a saturated or unsaturated, linear or branched acyl radical including from 8 to 24 carbon atoms, and $R'_2$ represents, independently of $R'_1$, a saturated or unsaturated, linear or branched hydrocarbon-based chain including from 1 to 24 carbon atoms, for example methyl laurate, ethyl laurate, propyl laurate, isopropyl laurate, butyl laurate, 2-butyl laurate, hexyl laurate, methyl cocoate, ethyl cocoate, propyl cocoate, isopropyl cocoate, butyl cocoate, 2-butyl cocoate, hexyl cocoate, methyl myristate, ethyl myristate, propyl myristate, isopropyl myristate, butyl myristate, 2-butyl myristate, hexyl myristate, octyl myristate, methyl palmitate, ethyl palmitate, propyl palmitate, isopropyl palmitate, butyl palmitate, 2-butyl palmitate, hexyl palmitate, octyl palmitate, methyl oleate, ethyl oleate, propyl oleate, isopropyl oleate, butyl oleate, 2-butyl oleate, hexyl oleate, octyl oleate, methyl stearate, ethyl stearate, propyl stearate, isopropyl stearate, butyl stearate, 2-butyl stearate, hexyl stearate, octyl stearate, methyl isostearate, ethyl isostearate, propyl isostearate, isopropyl isostearate, butyl isostearate, 2-butyl isostearate, hexyl isostearate, isostearyl isostearate;

diesters of fatty acids and of glycerol of formula (VI) and of formula (VII):

$$R'_3\text{—}(C\text{=}O)\text{—}O\text{—}CH_2\text{—}CH(OH)\text{—}CH_2\text{—}O\text{—}(C\text{=}O)\text{—}R'_4 \quad (VI)$$

$$R'_5\text{—}(C\text{=}O)\text{—}O\text{—}CH_2\text{—}CH[O\text{—}(C\text{=}O)\text{—}R'_6]\text{—}CH_2\text{—}OH \quad (VII),$$

in which formulae (VI) and (VII) $R'_3$—(C=O), $R'_4$—(C=O), $R'_5$—(C=O) and $R'_6$—(C=O), which may be identical or different, represent a saturated or unsaturated, linear or branched acyl group including from 8 to 24 carbon atoms;

triesters of fatty acids and of glycerol of formula (VIII):

$$R'_7\text{—}(C\text{=}O)\text{—}O\text{—}CH_2\text{—}CH[O\text{—}(C\text{=}O)\text{—}R''_8]\text{—}CH_2\text{—}O\text{—}(C\text{=}O)\text{—}R''_9 \quad (VIII),$$

in which $R'_7$—(C=O), $R'_8$—(C=O) and $R'_9$—(C=O), which may be identical or different, represent a saturated or unsaturated, linear or branched acyl group including from 8 to 24 carbon atoms.

According to another particular aspect of the present invention, said oil (H) is chosen from undecane, tridecane, isododecane and isohexadecane, mixtures of alkanes and of isoalkanes and of cycloalkanes, for instance the mixture ($M_1$) as defined previously and the mixtures sold under the names Emogreen™L15, Emogreen™L19, Emosmart™L15, Emosmart™L19, Emosmart™V21, Isopar™L or Isopar™M; the branched mineral oils sold under the names Marcol™52, Marcol™82, Drakeol™6VR, Eolane™130 or Eolane™150; hemisqualane, squalane, hydrogenated polyisobutene or hydrogenated polydecene; dioctyl ether or didecyl ether; isopropyl myristate, hexyl palmitate, octyl palmitate, isostearyl isostearate, octanoyl/decanoyl triglyceride, hexadecanoyl/octadecanoyl triglyceride, triglycerides derived from rapeseed oil, from sunflower oil, from linseed oil or from palm oil.

In said self-invertible inverse latex that is the subject of the present invention, the emulsifying system ($S_1$) of water-in-oil type consists either of a single emulsifying surfactant or of a mixture of emulsifying surfactants, on condition that said resulting emulsifying system ($S_1$) has an HLB value that is low enough to lead to the formation of emulsions of water-in-oil type. As emulsifying surfactant of water-in-oil type, examples include anhydrohexitol esters of linear or branched, saturated or unsaturated aliphatic carboxylic acids, including from 12 to 22 carbon atoms, optionally substituted with one or more hydroxyl groups, and more particularly esters of anhydrohexitols chosen from anhydrosorbitols and anhydromannitols and of linear or branched, saturated or unsaturated aliphatic carboxylic acids including from 12 to 22 carbon atoms, optionally substituted with one or more hydroxyl groups.

According to another particular aspect of the present invention, said emulsifying system ($S_1$) of water-in-oil type is chosen from the elements of the group consisting of sorbitan laurate, for example the product sold under the name Montane™ 20, sorbitan palmitate, for example the product sold under the name Montane™ 40, sorbitan stearate, for example the product sold under the name Montane™ 60, sorbitan oleate, for example the product sold under the name Montane™ 80, sorbitan sesquioleate, for example the product sold under the name Montane™ 85, sorbitan trioleate, for example the product sold under the name Montane™ 83, sorbitan isolaurate, sorbitan isostearate, for example the product sold under the name Montane™ 70, mannitan laurate, mannitan oleate, or a mixture of these esters; polyesters with a molecular weight of between 1000 and 3000 and derived from condensation between a poly(isobutenyl)succinic acid or the anhydride thereof, such as Hypermer™ 2296, or the mixture sold under the brand name Simaline™ IE 501A, the polyglycol polyhydroxystearates of formula (IX):

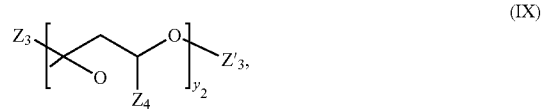

(IX)

in which formula (IX) $y_2$ represents an integer greater than or equal to 2 and less than or equal to 50, $Z_4$ represents a hydrogen atom, a methyl radical or an ethyl radical, and $Z_3$ represents a radical of formula (X):

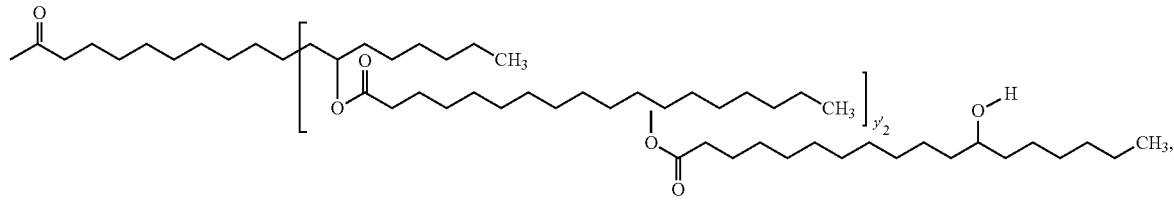

(X)

in which formula (X) $y'_2$ represents an integer greater than or equal to 0 and less than or equal to 10, more particularly greater than or equal to 1 and less than or equal to 10 and $Z'_3$ represents a radical of formula (X) as defined above, with $Z_3'$ being identical to or different from $Z_3$, or a hydrogen atom. Examples of emulsifying surfactants of water-in-oil type of formula (IX) that may be used to prepare the emulsifying system ($S_1$) are PEG-30 dipolyhydroxystearate sold under the name Simaline™ WO, or mixtures comprising PEG-30 dye polyhydroxystearate and sold under the names Simaline™IE 201 A and Simaline™IE 201 B, or the mixture comprising trimethylolpropane-30 tripolyhydroxystearate sold under the name Simaline™IE 301B.

In said self-invertible inverse latex that is the subject of the present invention, the emulsifying system ($S_2$) of oil-in-water type consists either of composition ($C_e$) alone or of a mixture of said composition ($C_e$) with one or more other emulsifying surfactants, on condition that said resulting emulsifying system ($S_2$) has an HLB value that is high enough to lead to the formation of emulsions of oil-in-water type.

According to another more particular aspect of the present invention, said self-invertible inverse latex as defined previously is characterized in that, in formula (I), n represents an integer greater than or equal to 1 and less than or equal to 10, and in that, in formula (II), p, which may be identical to or different from n, represents an integer greater than or equal to 1 and less than or equal to 10, and the group $R_1$—(C=O)— is chosen from octanoyl, decanoyl, ω-undecylenoyl, dodecanoyl, tetradecanoyl, hexadecanoyl, octadecanoyl, 9-octadecenoyl and 9,12-octadecadienoyl radicals.

According to another even more particular aspect of the present invention, in said formulae (I) and (II) as defined previously, n is equal to 10, p is equal to 10, and the group $R_1$—(C=O)— is the dodecanoyl radical; n is equal to 6, p is equal to 10 and the group $R_1$—(C=O)— is the dodecanoyl radical; n is equal to 6, p is equal to 6 and the group $R_1$—(C=O)— is the dodecanoyl radical or n is equal to 1, p is equal to 10 and the group $R_1$—(C=O)— is the dodecanoyl radical.

According to another more particular aspect of the present invention, said self-invertible inverse latex as defined previously is characterized in that, in said emulsifying system of oil-in water type ($S_2$), said composition ($C_e$) as defined previously consists of, per 100% of its mass:

$e_1$)—from 10% by mass to 60% by mass of at least one compound of formula (I) as defined previously and
$e_2$)—from 40% by mass to 90% by mass of at least one compound of formula (II) as defined previously.

The term "reducing sugar" in the definition of formula (III) as defined previously denotes saccharide derivatives that do not have in their structures any glycoside bond established between an anomeric carbon and the oxygen of an acetal group as defined in the reference publication: "Biochemistry, Daniel Voet/Judith G. Voet, page 250, John Wiley & Sons, 1990." The oligomeric structure $(G)_x$ may be in any isomeric form, whether it is optical isomerism, geometrical isomerism or regioisomerism; it may also represent a mixture of isomers.

According to another more particular aspect of the present invention, in composition ($C_e$) as defined previously, G represents, in formula (III) as defined previously, a reducing sugar residue chosen from glucose, dextrose, sucrose, fructose, idose, gulose, galactose, maltose, isomaltose, maltotriose, lactose, cellobiose, mannose, ribose, xylose, arabinose, lyxose, allose, altrose, dextran and tallose residues. Said residue G even more particularly represents, in formula (III) as defined previously, a reducing sugar chosen from glucose, xylose and arabinose residues.

By formula (III):

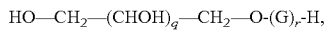

representing the composition ($C_{11}$) means that this composition ($C_{11}$) consists essentially of a mixture of compounds represented by formulae ($III_1$), ($III_2$), ($III_3$), ($III_4$) and ($III_5$):

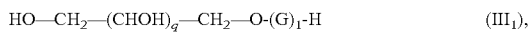 ($III_1$),

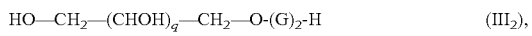 ($III_2$),

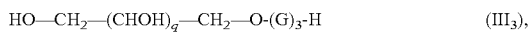 ($III_3$),

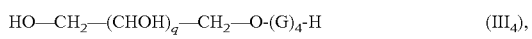 ($III_4$),

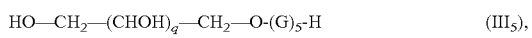 ($III_5$), in the respective molar proportions $a_1$, $a_2$, $a_3$, $a_4$ and $a_5$, such that:
the sum $a_1+a_2+a_3+a_4+a_5$ is equal to 1, and that
the sum $a_1+2a_2+3a_3+4a_4+5a_5$ is equal to r.

In the preceding definition, the term "essentially" indicates that the presence of one or more compounds of formula ($III_w$) with w greater than 5 is not excluded in composition ($C_{11}$), but that if it is present, then it is present in minimal proportions which do not entail any substantial modification of the properties of said composition ($C_{11}$).

In formula (III) as defined above, the group HO—$CH_2$—$(CHOH)_q$—$CH_2$—O— is linked to $(G)_r$ via the anomeric carbon of the saccharide residue, so as to form an acetal function.

According to a more particular aspect of the present invention, in formula (III) representing composition ($C_{11}$) as defined previously, r represents a decimal number greater than or equal to 1.05 and less than or equal to 3, more particularly greater than or equal to 1.15 and less than or equal to 2.5.

According to a more particular aspect of the present invention, said self-invertible inverse latex as defined previously is characterized in that, in formula (III) as defined previously, q is equal to 1, G represents a glucose residue and r represents a decimal number greater than or equal to 1.05 and less than or equal to 2.5.

According to another particular aspect of the present invention, said self-invertible inverse latex as defined previously is characterized in that, in said emulsifying system of oil-in water type ($S_2$), said composition ($C_e$) as defined previously consists of, per 100% of its mass:
- $e_1$)—from 5% by mass to 15% by mass of at least one compound of formula (I) as defined previously,
- $e_2$)—from 60% by mass to 80% by mass of at least one compound of formula (II) as defined previously, and
- $e_3$)—from 5% by mass to 15% by mass of at least one composition ($C_{11}$) represented by formula (III) as defined previously.

According to another aspect of the present invention, said emulsifying system ($S_2$) of oil-in-water type comprises, per 100% of its mass, at least 75% by mass of said composition ($C_e$) as defined previously.

According to a most particular aspect, said inverse latex as defined previously is characterized in that said emulsifying system of oil-in water type ($S_2$) is said composition ($C_e$) as defined previously.

Said self-invertible inverse latex which is the subject of the present invention is prepared by performing an "inverse emulsion polymerization" process, which is well known to those skilled in the art, and which comprises the following steps:
- a step a) of preparation of an aqueous phase comprising water, the water-soluble monomers and optionally the crosslinking monomer (AR), and also additives commonly used, for instance sequestrants such as ethylenediaminetetraacetic in its sodium salt form, or the pentasodium salt of diethylenetriaminepentaacetic acid (sold under the brand name Versenex™ 80);
- a step b) of mixing the oily phase (H) with the emulsifying system of water-in-oil type ($S_1$);
- a step c) of mixing the aqueous phase and the oily phase, prepared during the preceding steps, and of emulsification using a spindle of rotor-stator type;
- a step d) of inertizing with nitrogen;
- a step e) of initiating the polymerization reaction by introducing into the emulsion formed in c) a free-radical initiator and optionally a coinitiator; followed by leaving the reaction to proceed;
- a step f) of introducing the emulsifying system ($S_2$) of oil-in-water type as defined previously at a temperature of less than or equal to 50° C.

According to a particular aspect of the process as defined previously, the polymerization reaction of step e) is initiated with a redox couple which generates hydrogen sulfite ions ($HSO_3^-$), such as the cumene hydroperoxide-sodium metabisulfite ($Na_2S_2O_5$) couple or the cumene hydroperoxide-thionyl chloride ($SOCl_2$) couple at a temperature of less than or equal to 10° C., accompanied, if desired, by a polymerization coinitiator, for instance azobis(isobutyronitrile), and is then performed either quasi-adiabatically up to a temperature of greater than or equal to 50° C., or by controlling the temperature.

According to another particular aspect of the process as defined previously, the reaction medium derived from step e) is concentrated by distillation before performing step f).

According to another particular aspect of the process as defined previously, the reaction medium derived from step e) or from step f) is dried by atomization in a suitable facility.

According to another particular aspect of the process as defined previously, the aqueous phase prepared in step a) may comprise chain-reducing agents, which are intended to reduce the length of the polymer chains formed and to increase the degree of branching on the polymer, so as to modify the rheological properties.

Among the chain-reducing agents that are suitable for use in the process as defined previously, mention may be made of methanol, isopropanol, butylene glycol, 2-mercaptoethanol, thioglycolic acid and formic acid or salts thereof.

A subject of the invention is also a composition ($C_e$) comprising, per 100% of its mass:
- $e_1$)—from 10% by mass to 60% by mass, more particularly from 15% by mass to 60% by mass and even more particularly from 15% by mass to 50% by mass of at least one compound of formula (I):

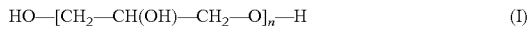

$$HO—[CH_2—CH(OH)—CH_2—O]_n—H \quad (I)$$

in which n represents an integer greater than or equal to 1 and less than or equal to 15;
- $e_2$)—from 40% by mass to 90% by mass, more particularly from 40% by mass to 85% by mass and even more particularly from 50% by mass to 85% by mass of at least one compound of formula (II):

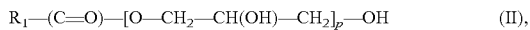

$$R_1—(C=O)—[O—CH_2—CH(OH)—CH_2]_p—OH \quad (II),$$

in which p, which is different from or identical to n, represents an integer greater than or equal to 1 and less than or equal to 15 and the group $R_1—(C=O)—$ represents a saturated or unsaturated, linear or branched aliphatic radical including from 6 to 22 carbon atoms; and optionally
- $e_3$)—up to 30% by mass, 0% by mass to 30% by mass, more particularly from 0% by mass to 25% by mass and more particularly from 0% by mass to 20% by mass of at least one composition ($C_{11}$) represented by formula (III):

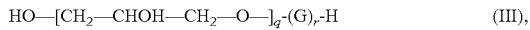

$$HO—[CH_2—CHOH—CH_2—O—]_q-(G)_r-H \quad (III),$$

in which formula (III) q, which may be identical to or different from n, represents an integer greater than or equal to 1 and less than or equal to 3, G represents a reducing sugar residue and r represents a decimal number greater than or equal to 1.05 and less than or equal to 5.00, said composition ($C_{11}$) consisting of a mixture of the compounds of formulae ($III_1$), ($III_2$), ($III_3$), ($III_4$) and ($III_5$):

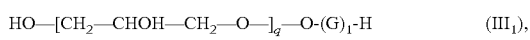
$$HO—[CH_2—CHOH—CH_2—O—]_q—O-(G)_1-H \quad (III_1),$$

$$HO—[CH_2—CHOH—CH_2—O—]_q—O-(G)_2-H \quad (III_2),$$

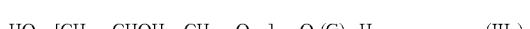
$$HO—[CH_2—CHOH—CH_2—O—]_q—O-(G)_3-H \quad (III_3),$$

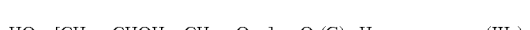
$$HO—[CH_2—CHOH—CH_2—O—]_q—O-(G)_4-H \quad (III_4),$$

$$HO—[CH_2—CHOH—CH_2—O—]_q—O-(G)_5-H \quad (III_5),$$

in molar proportions of said compounds of formulae ($III_1$), ($III_2$), ($III_3$), ($III_4$) and ($III_5$) respectively equal to $a_1$, $a_2$, $a_3$, $a_4$ and $a_5$, such that the sum $a_1+a_2+a_3+a_4+a_5$ is equal to 1, and such that the sum $a_1+2a_2+3a_3+4a_4+5a_5$ is equal to r; the sum of the mass proportions of compounds according to $e_1$), $e_2$) and $e_3$) being equal to 100% by mass.

According to a particular aspect, composition (Ce) as defined previously is characterized in that, in formula (I), n represents an integer greater than or equal to 1 and less than or equal to 10 and, in formula (II), p, which is different from n, represents an integer greater than or equal to 1 and less than or equal to 10.

According to this particular aspect, composition (Ce) as defined previously is more particularly characterized in that, in formula (I) as defined previously, n is equal to 1 or to 6 and, in formula (II), p is equal to 6 or to 10.

According to this particular aspect, composition ($C_e$) as defined previously is also characterized in that, in formulae (I) and (II) as defined previously, n and p are identical and each represent an integer greater than or equal to 1 and less than or equal to 10 and notably greater than or equal to 4 and less than or equal to 8.

According to this particular aspect, composition (Ce) as defined previously is more particularly characterized in that, in formulae (I) and (II) as defined, n and p are equal to 6.

According to another particular aspect of the present invention, in formula (II) as defined previously, the group $R_1$—(C=O)— is chosen from the elements of the group consisting of octanoyl, decanoyl, ω-undecylenoyl, dodecanoyl, tetradecanoyl, hexadecanoyl, octadecanoyl, 9-octadecenoyl and 9,12-octadecadienoyl radicals; it is more particularly the dodecanoyl radical.

A subject of the invention is also particularly composition ($C_e$) as defined previously, characterized in that it consists of, per 100% of its mass:

$e_1$)—from 10% by mass to 60% by mass of at least one compound of formula (I) as defined previously and $e_2$)—from 40% by mass to 90% by mass of at least one compound of formula (II) as defined previously.

A subject of the invention is also particularly composition ($C_e$) as defined previously, characterized in that, in formula (III) as defined previously, q is equal to 1, G represents a glucose residue and r represents a decimal number greater than or equal to 1.05 and less than or equal to 2.5.

According to another particular aspect of the present invention, composition ($C_e$) as defined previously is characterized in that it consists of, per 100% of its mass:

$e_1$)—from 5% by mass to 15% by mass of at least one compound of formula (I) as defined previously, $e_2$)—from 60% by mass to 80% by mass of at least one compound of formula (II) as defined previously, and $e_3$)—from 5% by mass to 15% by mass of at least one composition ($C_{11}$) represented by formula (III) as defined previously.

In formula (III), the term "reducing sugar" denotes the saccharide derivatives as defined previously and G represents, in formula (III) as defined previously, a reducing sugar residue chosen from glucose, dextrose, sucrose, fructose, idose, gulose, galactose, maltose, isomaltose, maltotriose, lactose, cellobiose, mannose, ribose, xylose, arabinose, lyxose, allose, altrose, dextran and tallose residues, and more particularly from glucose, xylose and arabinose residues.

Formula (III) representing composition ($C_{11}$) consists of a mixture of compounds represented by formulae ($III_1$), ($III_2$), ($III_3$), ($III_4$)) and ($III_5$) as defined previously. According to a more particular aspect of the present invention, in formula (III) representing composition ($C_{11}$) as defined previously, r represents a decimal number greater than or equal to 1.05 and less than or equal to 3, more particularly greater than or equal to 1.15 and less than or equal to 2.5.

According to a more particular aspect, a subject of the invention is a composition (Ce) as defined previously, for which, in formula (III), q is equal to 1, G represents a glucose residue and r represents a decimal number greater than or equal to 1.05 and less than or equal to 2.5.

According to another particular aspect, a subject of the invention is a composition (Ce) as defined previously, for which, in formula (I), n represents an integer greater than or equal to 1 and less than or equal to 10, in formula (II), p, which may be identical to or different from n, represents an integer greater than or equal to 1 and less than or equal to 10 and the group $R_1$—(C=O)— is chosen from octanoyl, decanoyl, ω-undecylenoyl, dodecanoyl, tetradecanoyl, hexadecanoyl, octadecanoyl, 9-octadecenoyl and 9,12-octadecadienoyl radicals, and, in formula (III), q is equal to 1, G represents a glucose residue and r represents a decimal number greater than or equal to 1.05 and less than or equal to 2.5.

According to a most particular aspect, a subject of the invention is a composition (Ce) as defined previously, for which, in formula (I), n is equal to 1, in formula (II), p is equal to 10 and the group $R_1$—(C=O)— is the dodecanoyl radical and, in formula (III), q is equal to 1, G represents a glucose residue and r represents a decimal number greater than or equal to 1.05 and less than or equal to 2.5.

Composition ($C_{11}$) optionally included in composition (Ce) is prepared according to a process comprising the following steps:

A step A) of reacting, in the desired proportions, a reducing sugar of formula (XI) or a mixture of reducing sugars of formula (XI):

$$\text{HO-G-H} \qquad (XI)$$

in which G represents the reducing sugar residue, with a molar excess of a compound of formula (XII) or of a mixture of compounds of formula (XII):

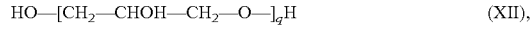

$$\text{HO—[CH}_2\text{—CHOH—CH}_2\text{—O—]}_q\text{H} \qquad (XII),$$

in which formula (XII) q is as defined previously for formula (III), to form a mixture of compounds of formula (III) as defined previously and an excess of said compound of formula (XII).

Step (A) of the process as defined previously may be completed, if necessary or if desired, by subsequent operations of neutralization, for example with sodium hydroxide or potassium hydroxide, and/or filtration and/or decolorization and/or removal of the residual polyol, for example by selective extraction using a suitable solvent medium.

Step A) is generally performed in a reactor in the presence of an acidic catalytic system, by controlling the stoichiometric ratio between the two reagents, and more particularly by introducing a molar excess of the mixture of alcohols of formula (II), with mechanical stirring under predetermined temperature and partial vacuum conditions, for example at a temperature of between 70° C. and 130° C. and under a partial vacuum of between 300 mbar ($3\times10^4$ Pa) and 20 mbar ($2\times10^3$ Pa). The term "acidic catalytic system" denotes strong acids such as sulfuric acid, hydrochloric acid, phosphoric acid, nitric acid, hypophosphorous acid, methanesulfonic acid, para-toluenesulfonic acid, trifluoromethanesulfonic acid, or ion-exchange resins.

A subject of the invention is also the use of said self-invertible inverse latex as defined previously, as a thickener and/or emulsifier and/or stabilizer for a detergent liquid aqueous composition for household or industrial use.

For the purposes of the present invention, the expression "detergent liquid aqueous compositions for household or industrial use" means compositions that are liquid at 20° C., which are designed and used for the cleaning of various types of surfaces, for instance textile fibers, hard surfaces of various natures, for instance glass, ceramic, tiles, wood, metal or composite materials. These "detergent liquid aqueous compositions for household or industrial use" find their applications for cleaning soiling from said surfaces, for instance for cleaning kitchenware manually or by means of a dishwasher, bottles, laundry manually or by means of a washing machine, floors, metal surfaces soiled with grease, windows, toilets or storage tanks.

Among these detergent liquid aqueous compositions for household or industrial use intended for the detergency of hard surfaces for household or industrial applications, alkaline aqueous cleaning compositions and acidic aqueous cleaning compositions may be distinguished. Such detergent liquid aqueous compositions for household or industrial use may be in the form of a solution, a gel, an emulsion of oil-in-water type or of water-in-oil type, or in the form of a dispersion.

According to a particular aspect, said use consists in thickening polar phases, for instance aqueous, alcoholic or aqueous-alcoholic phases or polar phases comprising polyols such as glycerol.

According to another particular aspect, said use consists in stabilizing an emulsion of oil-in-water type, or of water-in-oil type, giving said emulsion a homogeneous appearance during storage under various conditions, and more particularly at 25° C. for a time at least equal to one month, and more particularly at 4° C. for a time at least equal to one month, and more particularly at 45° C. for a time at least equal to one month.

According to another particular aspect, said use consists in stabilizing solid particles in detergent liquid aqueous compositions for household or industrial use.

These solid particles to be suspended may have various regular or irregular geometries, and may be in the form of pearls, beads, rods, flakes, strips or polyhedra. These solid particles are characterized by an apparent mean diameter of between 1 µm and 5 mm, more particularly between 10 µm and 1 mm.

Among the solid particles that may be suspended and stabilized with the self-invertible inverse latex as defined previously in detergent liquid aqueous compositions for household or industrial use are micas, iron oxide, titanium oxide, zinc oxide, aluminum oxide, talc, silica, kaolin, clays, boron nitride, calcium carbonate, magnesium carbonate, magnesium hydrogen carbonate, inorganic colored pigments, polyamides such as Nylon-6, polyethylenes, polypropylenes, polystyrenes, polyesters, acrylic or methacrylic polymers such as polymethyl methacrylates, polytetrafluoroethylene, crystalline or microcrystalline waxes, porous spheres, selenium sulfide, zinc pyrithione, starches, alginates, plant fibers, loofah particles and sponge particles.

A subject of the invention is also a detergent liquid aqueous composition (F) for household or industrial use, characterized in that it comprises as thickener, per 100% of its total mass, between 0.1% and 10% by mass of said self-invertible inverse latex as defined previously.

Said detergent liquid aqueous composition (F) that is the subject of the present invention is notably in the form of an aqueous solution, an emulsion or a microemulsion with an aqueous continuous phase, an emulsion or a microemulsion with an oily continuous phase, an aqueous gel, a foam, or in the form of an aerosol. It may be applied directly by soaking, by spraying or by vaporizing onto the surface to be cleaned or else by means of any type of support intended to be placed in contact with the hard surface to be cleaned (paper, wipe, textile).

In general, said detergent liquid aqueous composition (F) that is the subject of the present invention also includes ingredients usually used in the field of cleaning hard surfaces or textile fibers, such as nonionic surfactants, cationic surfactants, amphoteric surfactants, cationic polymers, nonionic polymers, thickeners, enzymes, bleaching agents, anticorrosion agents, solvents, acidic agents, alkaline agents, anti-limescale agents, preserving agents, fragrances, colorants, repellents, oxidizing agents, detergency adjuvants, anti-soiling agents or anti-redeposition agents.

Among the mineral acids that are particularly chosen as acidic agents in said detergent liquid aqueous composition (F), mention may be made of hydrochloric acid, nitric acid, phosphoric acid, sulfuric acid, hypophosphorous acid, phosphorous acid, hypochlorous acid, perchloric acid, carbonic acid, boric acid, manganic acid, permanganic acid, chromic acid, periodic acid, iodic acid, hypoiodous acid, hydrobromic acid, hydriodic acid and hydrofluoric acid.

Among the organic acids that are particularly chosen as acidic agents in said detergent liquid aqueous composition (F), mention may be made of formic acid, acetic acid, propionic acid, benzoic acid, salicylic acid, oxalic acid, malonic acid, succinic acid, glutaric acid, adipic acid, glycolic acid, lactic acid, malic acid, maleic acid, tartaric acid, citric acid, sorbic acid, sulfamic acid, dihydroacetic acid, dimethylsulfamic acid, fumaric acid, glutamic acid, isopropylsulfamic acid, valeric acid, benzenesulfonic acid, xylenesulfonic acid, 2-ethylhexanoic acid, capric acid, caproic acid, cresylic acid, dodecylbenzenesulfonic acid, peracetic acid, monochloroacetic acid and gluconic acid.

Among the alkaline agents associated with said self-invertible inverse latex as defined previously in said detergent liquid aqueous composition (F), mention may be made of the elements of the group consisting of alkali metal or alkaline-earth metal hydroxides, for instance sodium hydroxide, potassium hydroxide, barium hydroxide and calcium hydroxide.

Among the anti-limescale agents associated with said self-invertible inverse latex as defined previously in said detergent liquid aqueous composition (F), mention may be made of elements of the group consisting of sequestrants, for instance sodium tripolyphosphate (TPP), ethylenediaminetetraacetate (EDTA), tetraacetylethylenediamine (TAED), methylglycine diacetate (MGDA), sodium nitrilotriacetate (Na3NTA), sodium or potassium gluconate, sodium or potassium erythorbate, sodium or potassium polycarboxylate, and sodium citrate, of ion-exchange agents, for instance sodium zeolites or aluminosilicates, or lamellar sodium silicates, and precipitating agents, for instance calcium carbonate and sodium metasilicate.

The sequestrants, and more particularly the sequestrants described above, have the effect of complexing calcium and magnesium ions to form water-soluble complexes which are then removed during rinsing. The ion-exchange agents, and more particularly the ion-exchange agents described above, have the effect of exchanging their sodium ions with calcium and magnesium ions. The precipitating agents, and more particularly the sequestrants described above, have the effect of removing the ions responsible for the hardness of water by forming insoluble calcium compounds, which are subsequently removed with the soiling on the cleaned surfaces.

According to a more particular aspect, in said detergent liquid aqueous composition (F), the anti-limescale agent is chosen from the elements of the group consisting of sodium metasilicate, sodium tripolyphosphate (TPP), ethylenediaminetetraacetate (EDTA), tetraacetylethylenediamine (TAED), methylglycine diacetate (MGDA), sodium nitrilotriacetate (Na3NTA), sodium gluconate, sodium citrate and calcium carbonate.

Among the nonionic surfactants that may be associated with said self-invertible inverse latex as defined previously in said detergent liquid aqueous composition (F), mention may be made of:

block copolymers of ethylene oxide and of propylene oxide, and most particularly the block copolymers of ethylene oxide and of propylene oxide sold under the brand name Pluronic™ by the company BASF, for instance Pluronic™ PE 6100 and Pluronic™ PE 6200, defoaming nonionic surfactants of formula ($A_1$):

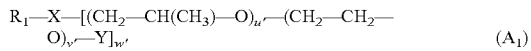
$$R_1-X-[(CH_2-CH(CH_3)-O)_{u'}-(CH_2-CH_2-O)_{v'}-Y]_{w'} \quad (A_1)$$

in which $R_1$ represents a saturated or unsaturated, linear or branched hydrocarbon-based aliphatic radical including from 6 to 18 carbon atoms, X represents a nitrogen atom or an oxygen atom, u' and v', which may be identical or different, each represent an integer between 1 and 50, w' is either equal to 1 if X represents an oxygen atom, or equal to 1 or to 2 if X represents a nitrogen atom, and Y represents a blocking functional group chosen from the elements of the group consisting of linear alkyl radicals including from 4 to 8 carbon atoms, for instance the butyl radical, the benzyl radical or a butylene oxide group.

Among the defoaming nonionic surfactants of formula ($A_1$), mention may be made of the products sold under the brand name Tergitol™ by the company Dow Chemical, for instance Tergitol™ L61E and Tergitol™ L64E, sparingly foaming nonionic surfactants of formula ($A_2$):

$$R_8-O-(S')_q-H \quad (A_2)$$

in which S' represents a reducing sugar residue chosen from the elements of the group consisting of glucose, xylose and arabinose, $R_8$ represents a saturated, linear or branched hydrocarbon-based radical including from 6 to 10 carbon atoms and q' represents a decimal number greater than or equal to 1.05 and less than or equal to 5.

As examples of sparingly foaming nonionic surfactants of formula ($A_2$) optionally present in said detergent liquid aqueous composition (F), mention may be made of hexyl polyglucosides, 2-ethylhexyl polyglucosides, n-heptyl polyglucosides and n-octyl polyglucosides.

Among the foaming and/or detergent amphoteric surfactants that may be associated with said self-invertible inverse latex as defined previously in said detergent liquid aqueous composition (F), mention may be made of alkylbetaines, alkylamidobetaines, sultaines, alkylamidoalkylsulfobetaines, imidazoline derivatives, phosphobetaines, amphopolyacetates, amphopropionates, β-alanine, and sodium N-(2-carboxyethyl)-N-(2-ethylhexyl) sold under the brand name Tomamine® Amphoteric 400 Surfactant.

Among the foaming and/or detergent amphoteric surfactants that may be associated with said self-invertible inverse latex as defined previously in said detergent liquid aqueous composition (F), there are alkylbetaines, alkylamidobetaines, sultaines, alkylamidoalkylsulfobetaines, imidazoline derivatives, phosphobetaines, amphopolyacetates and amphopropionates, β-alanine, and sodium N-(2-carboxyethyl)-N-(2-ethylhexyl) sold under the brand name Tomamine® Amphoteric 400 Surfactant.

Among the nonionic surfactants that may be associated with said self-invertible inverse latex as defined previously in said detergent liquid aqueous composition (F), mention may be made of alkoxylated monoglycerides, alkoxylated diglycerides, alkoxylated terpenic hydrocarbons such as ethoxylated and/or propoxylated α- or β-pinenes, containing from 1 to 30 oxyethylene and/or oxypropylene units, products resulting from the condensation of ethylene oxide or of propylene oxide with ethylenediamine, such as the Tetronic™ products sold by BASF, ethoxylated and/or propoxylated C8-C18 fatty acids containing from 5 to 25 mol of ethylene oxide and/or propylene oxide, ethoxylated fatty amides containing from 5 to 30 mol of ethylene oxide, ethoxylated amines containing from 5 to 30 mol of ethylene oxide, alkoxylated amidoamines containing from 1 to 50, preferably from 1 to 25 and most particularly from 2 to 20 mol of ethylene oxide and/or of propylene oxide.

Among the thickeners and/or gelling agents that may be associated with said self-invertible inverse latex as defined previously in said detergent liquid aqueous composition (F), mention may be made of polysaccharides consisting only of monosaccharides, such as glucans or glucose homopolymers, glucomannoglucans, xyloglycans, galactomannans of which the degree of substitution (DS) of the D-galactose units on the main D-mannose chain is between 0 and 1, and more particularly between 1 and 0.25, such as galactomannans originating from cassia gum (DS=⅕), locust bean gum (DS=¼), tara gum (DS=⅓), guar gum (DS=½) 25 or fenugreek gum (DS=1).

Among the thickeners and/or gelling agents that may be associated with said self-invertible inverse latex as defined previously in said detergent liquid aqueous composition (F), mention may be made of polysaccharides consisting of monosaccharide derivatives, such as sulfated galactans and more particularly carrageenans and agar, uronans and more particularly algins, alginates and pectins, heteropolymers of monosaccharides and of uronic acids, and more particularly xanthan gum, gellan gum, acacia gum exudates and karaya gum exudates, glucosaminoglycans. Among the thickeners and/or gelling agents that may be associated with said self-invertible inverse latex as defined previously in said detergent liquid aqueous composition (F), mention may be made of cellulose, cellulose derivatives such as methylcellulose, ethylcellulose, hydroxypropylcellulose, silicates, starch, hydrophilic starch derivatives, and polyurethanes.

Among the thickeners and/or gelling agents that may be associated with said self-invertible inverse latex as defined previously in said detergent liquid aqueous composition (F), mention may be made of inorganic thickeners, for instance clays, hectorite, saponite, sauconite, vermiculite or colloidal silica.

The thickeners present in composition (F) that is the subject of the present invention are used in amounts of between 0.1% and 10% by mass. Among the abrasive agents that may be associated with said self-invertible inverse latex as defined previously in said detergent liquid aqueous composition (F), mention may be made of materials of natural origin, for instance wood or kernel chips, inorganic abrasive materials such as oxides, quartzes, diatomaceous earths, colloidal silica dioxides, organic abrasive materials such as polyolefins, for instance polyethylenes and polypropylenes, polystyrenes, acetonitrile-butadiene-styrene resins, melamines, phenolic resins, epoxy resins or polyurethane resins.

The abrasive agents present in composition (F) that is the subject of the present invention are used in amounts of between 5.0% and 30% by mass.

Among the solvents that may be associated with said self-invertible inverse latex as defined previously in said detergent liquid aqueous composition (F), mention may be made of isopropyl alcohol, benzyl alcohol, 1,3-propanediol, chlorinated solvents, acetone, methyl ethyl ether, methyl isobutyl ether, butyl acetate, ethyl acetate, isopropyl acetate, isobutyl acetate, aromatic solvents, isoparaffins, isododecane, ethyl lactate, butyl lactate, terpenic solvents, rapeseed methyl esters, sunflower methyl esters, propylene glycol n-methyl ether, dipropylene glycol n-methyl ether, tripropylene glycol n-methyl ether, propylene glycol n-butyl ether, dipropylene glycol n-butyl ether, tripropylene glycol n-butyl ether, propylene glycol n-propyl ether, dipropylene glycol n-propyl ether, propylene glycol monomethyl ether acetate, propylene glycol diacetate, propylene glycol phenyl ether, ethylene glycol phenyl ether or dipropylene glycol dimethyl ether.

As examples of solvents present in composition (F) that is the subject of the present invention, mention may be made more particularly of the elements from the group consisting of propylene glycol n-methyl ether, dipropylene glycol n-methyl ether, tripropylene glycol n-methyl ether, propylene glycol n-butyl ether, dipropylene glycol n-butyl ether, tripropylene glycol n-butyl ether, propylene glycol n-propyl ether, dipropylene glycol n-propyl ether, propylene glycol phenyl ether, ethylene glycol phenyl ether, dipropylene glycol dimethyl ether, rapeseed methyl esters and sunflower methyl esters.

Among the enzymes that may be associated with said self-invertible inverse latex as defined previously in said detergent liquid aqueous composition (F), mention may be made of proteases, amylases, lipases, cellulases and peroxidases.

The enzymes present in composition (F) that is the subject of the present invention are used in amounts of between 0.005% and 0.5% by mass.

According to another aspect, a subject of the invention is the use of said detergent liquid aqueous composition (F) as defined previously, for cleaning hard surfaces.

The expression "for cleaning hard surfaces" denotes any action intended for removing soiling present on surfaces consisting of various materials.

The surfaces to be cleaned may be hard surfaces or textile surfaces. The term "hard surfaces" denotes, for example, floors, walls, window panes, tiles, household electrical appliances, kitchenware, countertops, tapware, sinks, tanks for storing chemical, food or agricultural products, vehicles (motor vehicles, motorbikes, trucks, etc.). The materials constituting these hard surfaces are, for example, glass (soda-lime, fluorocalcium, borosilicate, crystal), porcelain, earthenware, ceramic, polycarbonate or polypropylene plastics, stainless steel, silver, copper, aluminum, wood, synthetic resins, vitroceramic or linoleum, and may be coated with paints or varnishes. As examples of soiling that is present on these hard surfaces and that is to be removed by cleaning, examples that may be mentioned include food residues, grease, light and heavy hydrocarbons, burnt residues, dust, sludge, finger marks, soap residues and microorganisms.

According to another aspect, a subject of the invention is a process for cleaning a hard surface, characterized in that it comprises at least one step a"1) of applying said detergent liquid aqueous composition (F) as defined previously, followed by at least one step b"1) of rinsing said hard surface.

In step a"1) of the process as defined above, said detergent liquid aqueous composition (F) is applied to the surface comprising the soiling to be cleaned, by any means, for instance by total immersion, by spraying, by application by means of a support consisting of synthetic or natural, woven or nonwoven textile fibers, or paper, impregnated beforehand with said composition.

In step b"1) of the process as defined above, the rinsing of the hard surface onto which composition (F) for household or industrial use has been applied during step a"1) is performed by total immersion or by spraying with water.

Step b"1) of the cleaning process that is the subject of the invention may be performed at room temperature or at a temperature of between 30° C. and 80° C., more particularly at a temperature of between 30° C. and 65° C.

The examples that follow illustrate the invention without, however, limiting it.

DESCRIPTION OF THE PREFERRED EMBODIMENTS

I—Preparation of Surfactant Compositions According to the Invention and Comparative Compositions $I_A$—Preparation of a Composition Comprising Glyceryl Polyglucoside and Glycerol 650 g of glycerol, i.e. 5 molar equivalents, are introduced into a jacketed glass reactor, in which jacket circulates a heat-transfer fluid, and equipped with an efficient stirrer. The glycerol is heated to a temperature of about 100° C.

423.9 g, i.e. 1 molar equivalent, of glucose are then added gradually to the reaction medium to enable its homogeneous dispersion. An acidic catalytic system consisting of 0.51 g of 98% sulfuric acid is added to the mixture thus obtained.

The reaction medium is placed under a partial vacuum of 30 mbar, and maintained at a temperature of 100° C. to 105° C. for 4 hours with removal of the water formed by means of a distillation assembly.

The reaction medium is then cooled to 95° C.-100° C. and neutralized with 30% sodium hydroxide to bring the pH of a 1% solution of this mixture to a value of about 7.0.

The reaction mixture is emptied out to obtain the reference composition ($E_{IB}$).

The analytical characteristics of composition ($E_{IB}$) thus obtained are as follows:

Appearance (visual): clear liquid;
pH of 1% solution: 6.8;
Residual glycerol: 55.1%;
Residual glucose: <1%;
Glyceryl polyglucosides: 44.7%

$I_B$—Preparation of Composition ($EM_2$) Based on Decaglyceryl Laurate ($EM_1$) and Hexaglycerol 71.5 g of decaglyceryl monolaurate sold under the brand name Decaglyn 1-L (referred to hereinbelow as "Composition ($EM_1$)") and 28.5 g of polyglycerol-6 (sold under the brand name Polyglycerol-6™ by the company Spiga) are introduced into a jacketed glass reactor, in which jacket circulates a heat-transfer fluid, and equipped with an efficient mechanical stirrer, at a temperature of 35° C. with anchor-type mechanical stirring at a speed of 80 rpm. After stirring under such conditions for 30 minutes, the mixture is emptied out to obtain composition ($EM_2$).

$I_C$—Preparation of Composition ($EM_3$) Based on Decaglyceryl Laurate ($EM_1$) and Decaglycerol 71.5 g of decaglyceryl monolaurate sold under the brand name Decaglyn 1-L (referred to hereinbelow as "Composition ($EM_1$)") and 28.5 g of polyglycerol-10 (sold under the brand name Polyglycerin-10™) are introduced into a jacketed glass reactor, in which jacket circulates a heat-transfer fluid, and equipped with an efficient mechanical stirrer, at a temperature of 35° C. with anchor-type mechanical stirring at a speed of 80 rpm.

After stirring under such conditions for 30 minutes, the mixture is emptied out to obtain composition ($EM_3$).

$I_D$—Preparation of Composition ($EM_4$) Based on Decaglyceryl Laurate ($EM_1$), Glyceryl Polyglucoside and Glycerol ($E_{IB}$)

71.5 g of decaglyceryl monolaurate sold under the brand name Decaglyn 1-L (referred to hereinbelow as "Composition (EM$_1$)") and 28.5 g of composition (E$_{IB}$), the preparation of which is described above, are introduced into a jacketed glass reactor, in which jacket circulates a heat-transfer fluid, and equipped with an efficient mechanical stirrer, at a temperature of 35° C. with anchor-type mechanical stirring at a speed of 80 rpm. After stirring under such conditions for 30 minutes, the mixture is emptied out to obtain composition (EM$_4$).

I$_E$—Preparation of Composition (EM$_5$) Based on Decaglyceryl Laurate (EM$_1$) and Glycerol 71.5 g of decaglyceryl monolaurate sold under the brand name Decaglyn 1-L (referred to hereinbelow as "Composition (EM$_1$)") and 28.5 g of glycerol are introduced into a jacketed glass reactor, in which jacket circulates a heat-transfer fluid, and equipped with an efficient mechanical stirrer, at a temperature of 35° C. with anchor-type mechanical stirring at a speed of 80 rpm. After stirring under such conditions for 30 minutes, the mixture is emptied out to obtain composition (EM$_5$).

The analytical characteristics of compositions (EM$_1$), (EM$_2$), (EM$_3$), (EM$_4$), (EM$_5$) and (EM$_6$) are collated in table 1 below.

TABLE 1

| | Emulsifying composition | | | | |
|---|---|---|---|---|---|
| | (EM$_1$) | (EM$_2$) | (EM$_3$) | (EM$_4$) | (EM$_5$) |
| Proportions of constituents (mass %) | | | | | |
| Decaglyceryl monolaurate | 100% | 71.5% | 71.5% | 71.5% | 71.5% |
| Mass proportion of hexaglycerol | 0% | 28.5 | 0% | 0% | 0% |
| Mass proportion of decaglycerol | 0% | 0% | 28.5 | 0% | 0% |
| Mass proportion of glyceryl polyglucoside | 0% | 0% | 0% | 12.8% | 0% |
| Mass proportion of glycerol | 0% | 0% | 0% | 15.7% | 28.5 |

II—Preparation and Evaluation of Self-Invertible Inverse Latices of a Crosslinked Copolymer of the Sodium Salt of 2-methyl-[(1-oxo-2-propenyl)amino]-1-propanesulfonic Acid and of Partially Salified Acrylic Acid An aqueous phase is prepared by successively pouring into a beaker, with stirring, 75.4 g of glacial acrylic acid, 577.5 g of an aqueous solution containing 55% of the sodium salt of 2-methyl[(1-oxo-2-propenyl)amino]-1-propanesulfonic acid, 42.5 g of an aqueous solution containing 48% by mass of sodium hydroxide, 0.45 g of a commercial aqueous solution containing 40% by mass of sodium diethylenetriaminepentaacetate and 0.167 g of methylenebis (acrylamide). The pH of this aqueous phase is then adjusted to 5.5.

Independently, an organic phase is prepared by mixing 208 g of the alkane mixture sold under the brand name Emogreen™ L15, 14 g of Montane™ 80, 9.5 g of Montane™ 70 and 0.2 g of azobis(isobutyronitrile) (AIBN).

The aqueous phase prepared is then gradually added to the oily phase and then dispersed using an Ultra-Turrax rotor-stator sold by the company IKA.

The emulsion obtained is transferred into a reactor, subjected to sparging with nitrogen to remove the oxygen, and cooled to about 5-6° C. 5 cm$^3$ of a solution containing 0.42% by mass of cumene hydroperoxide in Emogreen™L15 are added to the emulsion with continuous stirring, followed by gradual introduction of an aqueous solution containing 0.1% by mass of sodium metabisulfite at a flow rate of 0.5 cm$^3$ per minute to initiate the polymerization reaction. The temperature of the medium increases up to a steady stage. The reaction medium is then heated at 85° C. for 1 hour and the assembly is then cooled to about 35° C. to obtain the noted mixture (M$_2$).

The mixture (M$_2$) obtained previously is split into various portions, to which are added the various surfactant compositions (EM$_1$), (EM$_2$), (EM$_3$), (EM$_4$) and (EM$_5$), as described above, heated beforehand to 60° C., in mass proportions as indicated in table 2 below.

The self-invertible inverse latices resulting from these mixtures are respectively noted (IL$_1$), (IL$_2$), (IL$_3$), (IL$_4$) and (IL$_5$), and are evaluated by observation of their appearance at 25° C., by the rate of inversion during the preparation of an aqueous gel containing 2% by mass of self-invertible inverse latex, and by the viscosity of this aqueous gel containing 2% by mass of a self-invertible inverse latex.

The method for evaluating the inversion time of the self-invertible inverse latices consists in pouring into a 2 liter beaker the required amount of water for the preparation of 800 g of an aqueous gel. A 2004 model Turbotest™ mechanical stirrer impeller sold by the company VMI, connected to a motor, is placed at the bottom of the beaker. Stirring is started at a speed of 900 rpm and the required amount of self-invertible inverse latex to be evaluated is introduced into the beaker with stirring. The stirrer creates a vortex which disappears when the polymer becomes inverted and the gel forms. The inversion time, measured in seconds, of the self-invertible inverse latices corresponds to the time elapsed between the start of addition of the test self-invertible inverse latex and the disappearance of the vortex, leading to the production of a smooth gel, free of lumps. This evaluation is performed on conclusion of the manufacture of the test inverse latices (t=0) and then after a period of storage of 3 months at 25° C. (t=3 months). The results obtained are given in table 2 below. The viscosity of an aqueous gel containing 2% by mass of self-invertible inverse latex (μ) is measured at t=0 and then at t=3 months, using a Brookfield RVT viscometer (spindle 6, speed 5). Similarly, the appearance of the self-invertible inverse latex is evaluated visually at t=0.

TABLE 2

| | Self-invertible inverse latices | | | | |
|---|---|---|---|---|---|
| | (IL$_1$) | (IL$_2$) | (IL$_3$) | (IL$_4$) | (IL$_5$) |
| | Reference of the test surfactant composition | | | | |
| | (EM$_1$) | (EM$_2$) | (EM$_3$) | (EM$_4$) | (EM$_5$) |
| Amount tested (EMi)/(ILi) (mass %) | 5% | 7% | 7% | 7% | 7% |
| | Measured at t = 0 | | | | |
| μ (in mPa · s) | 120 000 | 116 000 | 104 000 | 98 000 | 104 000 |
| Inversion time | 130 s | 38 s | 38 s | 60 s | 16 s |
| Appearance of the self-invertible latex at 25° C. | Mle* | Mle* | Mle* | Mle* | Mle* |
| | Measured at T = 3 months (3M) | | | | |
| μ (in mPa · s) | 97 000 | 98 000 | 100 000 | 94 000 | 95 000 |
| Inversion time | 151 s | 55 s | 78 s | 78 s | 17 s |

Mle*: Milky liquid emulsion

The self-invertible inverse latices (IL$_2$), (IL$_3$), (IL$_4$) and (IL$_5$) according to the invention, and free of alkoxylated and more particularly ethoxylated derivatives, make it possible to obtain smooth gels, with an inversion time that is considerably shorter than that observed for the self-invertible inverse latex ($IL_1$) comprising only decaglyceryl monolaurate as constituent of the inverting surfactant system, while at the same time maintaining excellent thickening properties. Furthermore, they are characterized by better reproducibility of the rate of inversion and of the thickening properties after three months of storage than for the comparative self-invertible inverse latex ($IL_1$).

III—Preparation and Evaluation of Self-Invertible Inverse Latices of a Crosslinked Copolymer of the Sodium Salt of 2-methyl-[(1-oxo-2-propenyl)amino]-1-propanesulfonic Acid and of Partially Salified Acrylic Acid Example II, described above, is repeated, replacing the 208 g of Emogreen™ L15 with 208 g of isohexadecane, to obtain the noted mixture ($M_3$), which is split into various portions to which are added the various surfactant compositions ($EM_1$), ($EM_2$) and ($EM_3$) as described above, heated beforehand to 60° C., in mass proportions as indicated in table 3 below. The self-invertible inverse latices resulting from these mixtures are respectively noted ($IL_6$), ($IL_7$) and ($IL_8$), and are evaluated by observation of their appearance at 25° C., by the rate of inversion during the preparation of an aqueous gel containing 2% by mass of self-invertible inverse latex (the method of which is described above), and by the viscosity of this aqueous gel containing 2% by mass of a self-invertible inverse latex (μ; Brookfield RVT viscometer (spindle 6, speed 5)). This evaluation is performed on conclusion of the manufacture of the test inverse latices (t=0) and then after a period of storage of 3 months at 25° C. (t=3 months).

The results obtained are given in table 3 below.

TABLE 3

|  | Self-invertible inverse latices | | |
| --- | --- | --- | --- |
|  | ($IL_6$) | ($IL_7$) | ($IL_8$) |
|  | Test surfactant composition | | |
|  | ($EM_1$) | ($EM_2$) | ($EM_3$) |
| Amount tested (EMi)/(ILi) (mass %) | 5% | 7% | 7% |
|  | Measured at t = 0 | | |
| μ (in mPa · s) | 108 000 | 106 000 | 110 000 |
| Inversion time | 125 s | 60 s | 25 s |
| Appearance of the self-invertible latex at 25° C. | Mle* | Mle* | Mle* |
|  | Measured at t = 3 months | | |
| μ (in mPa · s) | 97 000 | 102 000 | 105 000 |
| Inversion time | 155 s | 70 s | 72 s |

Mle*: Milky liquid emulsion

The self-invertible inverse latices ($IL_7$) and ($IL_8$) according to the invention, and free of alkoxylated and more particularly ethoxylated derivatives, make it possible to obtain smooth gels, with an inversion time that is considerably shorter than that observed for the self-invertible inverse latex ($IL_6$) comprising only decaglyceryl monolaurate as constituent of the inverting surfactant system, while at the same time maintaining excellent thickening properties. Furthermore, they are characterized by better reproducibility of the rate of inversion and of the thickening properties after three months of storage than for the comparative self-invertible inverse latex ($IL_1$).

IV: Illustrative Detergent Formulations

In the formulations below, the percentages are expressed as mass percentages per 100% of the mass of the formulation.

$IV_A$—Cleaning Composition for Ovens and Cooking Grills

| Ingredients | Mass content |
| --- | --- |
| Simulsol ™OX1309L[1] | 2% |
| Simulsol ™SL7G[2] | 2% |
| Composition ($IL_2$) | 6% |
| Sodium hydroxide: | 25% |
| Water: | qs 100% |

[1]Simulsol ™ OX1309L: detergent surfactant composition sold by the company SEPPIC, comprising polyethoxylated alcohols resulting from the reaction of 1 molar equivalent of an alcohol sold under the brand name Exxal ™13 with 9 molar equivalents of ethylene oxide.
[2]Simulsol ™SL7G: solution of n-heptyl polyglucosides, hydrotropic and solubilizing agent sold by the company SEPPIC Preparation a) A pre-gel is prepared at 20° C. by adding Simulsol™ OX1309L and then Simulsol™SL7G in water. Composition ($IL_2$) according to the invention is then introduced into the aqueous solution and mixed until a gel of stable viscosity is obtained.

b) Sodium hydroxide is then gradually introduced with mechanical stirring at a temperature of 20° C. until a homogeneous gel is obtained. The gel obtained on conclusion of step b) is of homogeneous and clear appearance, with a viscosity of 10 000 mPa·s (Brookfield LVT at a speed of 6 rpm). After a period of storage of 6 months at 25° C., the gel obtained on conclusion of step b) of this procedure is of homogeneous and clear appearance, with a viscosity of 12 000 mPa·s (Brookfield LVT at a speed of 6 rpm).

Cleaning Process

The composition prepared above is sprayed at room temperature onto the walls of an oven soiled with food grease and onto cooking grills also soiled with food grease. After 10 minutes, the walls of the oven and of the cooking grills are rinsed with hot water at 60° C. The walls of the oven and the surfaces of the cooking grills thus cleaned no longer have any soiling.

$IV_B$—Cleaning Agent for Aluminum Surfaces

| Ingredients | Mass content |
| --- | --- |
| Simulsol ™OX1309L | 3% |
| Simulsol ™SL7G | 3% |
| Composition ($IL_2$) | 5% |
| 75% phosphoric acid | 40% |
| Hordaphos[3] MDGB 1% | 5% |
| Dipropylene glycol methyl ether | 5% |
| Water: | qs 100% |

[3]Hordaphos ™ MDGB is a composition based on phosphoric esters, used as an anticorrosion agent.

Preparation

Each ingredient is successively introduced into a mixing tank with moderate mechanical stirring, at room temperature, until a homogeneous, clear composition is obtained. Stirring is maintained for 30 minutes at 20° C. The composition obtained has a measured pH value of less than 1.0 and is clear and homogeneous after storage for a period of one month at 40° C.

Cleaning Process

The composition prepared in the preceding paragraph is diluted to 3% in water and the solution thus obtained is sprayed onto the aluminum wall to be cleaned. This wall is then rinsed with hot water at 60° C.

The invention claimed is:

1. A self-invertible inverse latex of a crosslinked anionic polyelectrolyte (P) comprising, per 100 mol %:
   ($a_1$)—a proportion of greater than or equal to 30 mol % and less than or equal to 100 mol %, of monomer units derived from 2-methyl-2-[(1-oxo-2-propenyl)amino]-1-propanesulfonic acid in free acid or partially or totally salified form;

($a_2$)—a proportion of greater than 0 mol % and less than or equal to 70%, of monomer units derived from at least one monomer chosen from the elements of the group consisting of acrylic acid, methacrylic acid, 2-carboxyethylacrylic acid, itaconic acid, maleic acid, 3-methyl-3-[(1-oxo-2-propenyl)amino]butanoic acid, the carboxylic function of said monomers being in free acid, partially or totally salified form, and/or from the elements of the group consisting of (2-hydroxyethyl) acrylate, (2,3-dihydroxypropyl) acrylate, (2-hydroxyethyl) methacrylate, (2,3-dihydroxypropyl) methacrylate or vinylpyrrolidone;

($a_3$)—a proportion of greater than 0 mol % and less than or equal to 1 mol %, of monomer units derived from at least one diethylenic or polyethylenic crosslinking monomer (AR);

the sum of said molar proportions of monomer units according to $a_1$), $a_2$) and $a_3$) being equal to 100 mol %;

said self-invertible inverse latex being an emulsion of water-in-oil type (E) comprising, per 100% of its mass:

a)—from 10% by mass to 90% by mass of said crosslinked anionic polyelectrolyte (P);

b)—from 5% by mass to 50% by mass of a fatty phase consisting of at least one oil (H);

c)—from 1% by mass to 50% by mass of water;

d)—from 0.5% by mass to 10% by mass of an emulsifying system of water-in-oil type ($S_1$); and e)—from 2% by mass to 10% by mass of an emulsifying system of oil-in-water type ($S_2$);

the sum of the mass proportions of compounds according to a), b), c), d) and e) being equal to 100% by mass;

wherein said emulsifying system of oil-in-water type ($S_2$) comprises, per 100% of its mass:

f)—a proportion of greater than or equal to 50% by mass and less than or equal to 100% by mass of a composition (Ce) comprising, per 100% of its mass:

$e_1$)—from 10% by mass to 60% by mass of at least one compound of formula (I):

$$HO-[CH_2-CH(OH)-CH_2-O]_n-H \quad (I)$$

in which n represents an integer greater than or equal to 1 and less than or equal to 15;

$e_2$)—from 40% by mass to 90% by mass of at least one compound of formula (II):

$$R_1-(C=O)-[O-CH_2-CH(OH)-CH_2]_p-OH \quad (II),$$

in which p, which is different from or identical to n, represents an integer greater than or equal to 1 and less than or equal to 15; and in which the group $R_1-(C=O)-$ represents a saturated or unsaturated, linear or branched aliphatic radical including from 6 to 22 carbon atoms; and $e_3$)—up to 30% by mass of at least one composition ($C_{11}$) represented by formula (III):

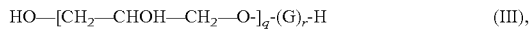

in which q, which is different from or identical to n, represents an integer greater than or equal to 1 and less than or equal to 3, G represents a reducing sugar residue and r represents a decimal number greater than or equal to 1.05 and less than or equal to 5.00;

said composition ($C_{11}$) consisting of a mixture of the compounds of formulae ($III_1$), ($III_2$), ($III_3$), ($III_4$) and ($III_5$):

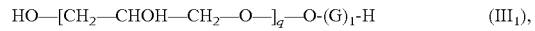

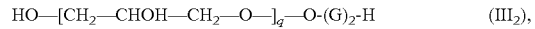

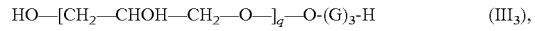

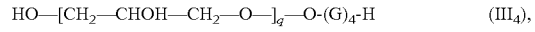

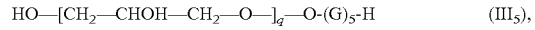

in molar proportions of said compounds of formulae ($III_1$), ($III_2$), ($III_3$), ($III_4$) and ($III_5$) respectively equal to $a_1$, $a_2$, $a_3$, $a_4$ and $a_5$, such that the sum $a_1+a_2+a_3+a_4+a_5$ is equal to 1, and such that the sum $a_1+2a_2+3a_3+4a_4+5a_5$ is equal to r;

the sum of the mass proportions of compounds according to $e_1$), $e_2$) and $e_3$) being equal to 100% by mass.

2. The self-invertible inverse latex as defined in claim 1, wherein said crosslinked anionic polyelectrolyte (P) is a homopolymer of 2-methyl-2-[(1-oxo-2-propenyl)amino]-1-propanesulfonic acid partially or totally salified in the sodium salt or ammonium salt form, crosslinked with triallylamine and/or methylenebis(acrylamide); a copolymer of 2-methyl-2-[(1-oxo-2-propenyl)amino]-1-propanesulfonic acid and of acrylic acid which are partially or totally salified in the sodium salt or ammonium salt form, crosslinked with triallylamine and/or methylenebis(acrylamide); a copolymer of 2-methyl-2-[(1-oxo-2- propenyl)amino]-1-propanesulfonic acid (γ) partially or totally salified in the sodium salt form and of acrylic acid (δ) partially or totally salified in the sodium salt form in a mole ratio (γ)/(δ) of greater than or equal to 30/70 and less than or equal to 90/10, crosslinked with triallylamine and/or methylenebis(acrylamide); or a copolymer of 2-methyl-2-[(1-oxo-2-propenyl)amino]-1-propanesulfonic acid (γ) partially or totally salified in the sodium salt form and of acrylic acid (δ) partially or totally salified in the sodium salt form in a mole ratio (γ)/(δ) of greater than or equal to 40/60 and less than or equal to 90/10, crosslinked with triallylamine and/or methylenebis(acrylamide).

3. The self-invertible inverse latex as defined in claim 1, wherein in formula (I) as defined previously, n represents an integer greater than or equal to 1 and less than or equal to 10, and wherein, in formula (II) as defined previously, p, which may be identical to or different from n, represents an integer greater than or equal to 1 and less than or equal to 10, and the group $R_1-(C=O)-$ is chosen from octanoyl, decanoyl, ω-undecylenoyl, dodecanoyl, tetradecanoyl, hexadecanoyl, octadecanoyl, 9- octadecenoyl and 9,12-octadecadienoyl radicals.

4. The self-invertible inverse latex as defined in claim 1, wherein, in said emulsifying system of oil-in-water type ($S_2$), said composition ($C_e$) as defined previously consists of, per 100% of its mass:

$e_1$)—from 10% by mass to 60% by mass of at least one compound of formula (I) as defined previously and $e_2$)—from 40% by mass to 90% by mass of at least one compound of formula (II) as defined previously.

5. The self-invertible inverse latex as defined in claim 1, wherein, in formula (III) as defined previously, q is equal to 1, G represents a glucose residue and r represents a decimal number greater than or equal to 1.05 and less than or equal to 2.5.

6. The self-invertible inverse latex as defined in claim 1, wherein, in said emulsifying system of oil-in-water type ($S_2$), said composition ($C_e$) as defined previously consists of, per 100% of its mass:
- $e_1$)—from 5% by mass to 15% by mass of at least one compound of formula (I) as defined previously,
- $e_2$)—from 60% by mass to 80% by mass of at least one compound of formula (II) as defined previously, and
- $e_3$)—from 5% by mass to 15% by mass of at least one composition ($C_{11}$) represented by formula (III) as defined previously.

7. The inverse latex as defined in claim 1, wherein said emulsifying system of oil-in-water type ($S_2$) is said composition ($C_e$) as defined previously.

8. A composition ($C_e$) comprising, per 100% of its mass:
- $e_1$)—from 10% by mass to 60% by mass of at least one compound of formula (I):

$$HO-[CH_2-CH(OH)-CH_2-O]_n-H \quad (I)$$

in which n represents an integer greater than or equal to 1 and less than or equal to 15;
- $e_2$)—from 40% by mass to 90% by mass of at least one compound of formula (II):

$$R_1-(C=O)-[O-CH_2-CH(OH)-CH_2]_p-OH \quad (II), \text{ and}$$

in which p, which is different from or identical to n, represents an integer greater than or equal to 1 and less than or equal to 15 and the group $R_1-(C=O)-$ represents a saturated or unsaturated, linear or branched aliphatic radical including from 6 to 22 carbon atoms; and
- $e_3$)—up to 30% by mass of at least one composition ($C_{11}$) represented by formula (III):

$$HO-[CH_2-CHOH-CH_2-O-]_q-(G)_r-H \quad (III),$$

in which q, which may be identical to or different from n, represents an integer greater than or equal to 1 and less than or equal to 3, G represents a reducing sugar residue and r represents a decimal number greater than or equal to 1.05 and less than or equal to 5.00, said composition ($C_{11}$) consisting of a mixture of the compounds of formulae ($III_1$), ($III_2$), ($III_3$), ($III_4$) and ($III_5$):

$$HO-[CH_2-CHOH-CH_2-O-]_q-O-(G)_1-H \quad (III_1),$$

$$HO-[CH_2-CHOH-CH_2-O-]_q-O-(G)_2-H \quad (III_2),$$

$$HO-[CH_2-CHOH-CH_2-O-]_q-O-(G)_3-H \quad (III_3),$$

$$HO-[CH_2-CHOH-CH_2-O-]_q-O-(G)_4-H \quad (III_4),$$

$$HO-[CH_2-CHOH-CH_2-O-]_q-O-(G)_5-H \quad (III_5),$$

in molar proportions of said compounds of formulae ($III_1$), ($III_2$), ($III_3$), ($III_4$) and ($III_5$) respectively equal to $a_1$, $a_2$, $a_3$, $a_4$ and $a_5$, such that the sum $a_1+a_2+a_3+a_4+a_5$ is equal to 1, and such that the sum $a_1+2a_2+3a_3+4a_4+5a_5$ is equal to r;
the sum of the mass proportions of compounds according to $e_1$), $e_2$) and $e_3$) being equal to 100% by mass.

9. The composition (Ce) as defined in claim 8, wherein, in formula (I) as defined previously, n represents an integer greater than than or equal to 1 and less than or equal to 10, and wherein, in formula (II) as defined previously, p, which may be identical to or different from n, represents an integer greater than or equal to 1 and less than or equal to 10, and the group $R_1-(C=O)-$ is chosen from octanoyl, decanoyl, ω-undecylenoyl, dodecanoyl, tetradecanoyl, hexadecanoyl, octadecanoyl, 9-octadecenoyl and 9,12-octadecadienoyl radicals.

10. The composition ($C_e$) as defined in claim 8, consisting of, per 100% of its mass:
- $e_1$)—from 10% by mass to 60% by mass of at least one compound of formula (I) as defined previously and
- $e_2$)—from 40% by mass to 90% by mass of at least one compound of formula (II) as defined previously.

11. The composition ($C_e$) as defined in claim 8, wherein, in formula (III) as defined previously, q is equal to 1, G represents a glucose residue and r represents a decimal number greater than or equal to 1.05 and less than or equal to 2.5.

12. The composition ($C_e$) as defined in claim 8, consisting of, per 100% of its mass:
- $e_1$)—from 10% by mass to 15% by mass of at least one compound of formula (I) as defined previously,
- $e_2$)—from 60% by mass to 80% by mass of at least one compound of formula (II) as defined previously, and
- $e_3$)—from 5% by mass to 15% by mass of at least one composition ($C_{11}$) represented by formula (III) as defined previously.

13. A method of thickening, and or emulsifying, and/or stabilizing a detergent liquid aqueous composition for household or industrial use, comprising adding an effective amount of said self-invertible inverse latex as defined in claim 1 to the detergent liquid aqueous composition.

14. A detergent liquid aqueous composition (F) for household or industrial use, comprising as thickener, per 100% of its total mass, between 0.1% and 10% by mass of said self-invertible inverse latex as defined in claim 1.

15. A process for cleaning a hard surface, comprising at least one step a"1) of applying said detergent liquid aqueous composition (F) as defined in claim 14, followed by at least one step b"1) of rinsing said hard surface.

16. A self-invertible inverse latex of a crosslinked anionic polyelectrolyte (P) comprising, per 100 mol %:
- ($a_1$)—a proportion of greater than or equal to 30 mol % and less than or equal to 100 mol %, of monomer units derived from 2-methyl-2-[(1-oxo-2-propenyl)amino]-1-propanesulfonic acid in free acid or partially or totally salified form; and
- ($a_2$)—a proportion of greater than 0 mol % and less than or equal to 1 mol %, of monomer units derived from at least one diethylenic or polyethylenic crosslinking monomer (AR);
the sum of said molar proportions of monomer units according to $a_1$) and $a_2$) being equal to 100 mol %;
said self-invertible inverse latex being an emulsion of water-in-oil type (E) comprising, per 100% of its mass:
- a)—from 10% by mass to 90% by mass of said crosslinked anionic polyelectrolyte (P);
- b)—from 5% by mass to 50% by mass of a fatty phase consisting of at least one oil (H);
- c)—from 1% by mass to 50% by mass of water;
- d)—from 0.5% by mass to 10% by mass of an emulsifying system of water-in-oil type ($S_1$); and
- e)—from 2% by mass to 10% by mass of an emulsifying system of oil-in-water type ($S_2$);
the sum of the mass proportions of compounds according to a), b), c), d) and e) being equal to 100% by mass;
wherein said emulsifying system of oil-in-water type ($S_2$) comprises, per 100% of its mass:
- f)—a proportion of greater than or equal to 50% by mass and less than or equal to 100% by mass of a composition (Ce) comprising, per 100% of its mass:

$e_1$)—from 10% by mass to 60% by mass of at least one compound of formula (I):

$$HO—[CH_2—CH(OH)—CH_2—O]_n—H \quad (I)$$

in which n represents an integer greater than or equal to 1 and less than or equal to 15;

$e_2$)—from 40% by mass to 90% by mass of at least one compound of formula (II):

$$R_1—(C=O)—[O—CH_2—CH(OH)—CH_2]_p—OH \quad (II), and$$

in which p, which is different from or identical to n, represents an integer greater than or equal to 1 and less than or equal to 15; and in which the group $R_1$—(C=O)— represents a saturated or unsaturated, linear or branched aliphatic radical including from 6 to 22 carbon atoms;

the sum of the mass proportions of compounds according to $e_1$) and $e_2$) being equal to 100% by mass.

17. The self-invertible inverse latex as defined in claim 16, wherein, in formula (I) as defined previously, n represents an integer greater than than or equal to 1 and less than or equal to 10, and wherein, in formula (II) as defined previously, p, which may be identical to or different from n, represents an integer greater than or equal to 1 and less than or equal to 10, and the group $R_1$—(C=O)— is chosen from octanoyl, decanoyl, ω-undecylenoyl, dodecanoyl, tetradecanoyl, hexadecanoyl, octadecanoyl, 9-octadecenoyl and 9,12-octadecadienoyl radicals.

18. The self-invertible inverse latex as defined in claim 17, wherein, in said emulsifying system of oil-in-water type ($S_2$), said composition ($C_e$) as defined previously consists of, per 100% of its mass:
$e_1$)—from 10% by mass to 60% by mass of at least one compound of formula (I) as defined previously and
$e_2$)—from 40% by mass to 90% by mass of at least one compound of formula (II) as defined previously.

19. The composition ($C_e$) as defined in claim 8, wherein, in formula (I) as defined previously, n represents an integer greater than or equal to 1 and less than or equal to 10, and wherein, in formula (II) as defined previously, p, which may be identical to or different from n, represents an integer greater than or equal to 1 and less than or equal to 10, and the group $R_1$—(C=O)— is chosen from octanoyl, decanoyl, ω-undecylenoyl, dodecanoyl, tetradecanoyl, hexadecanoyl, octadecanoyl, 9-octadecenoyl and 9,12-octadecadienoyl radicals.

* * * * *